(12) United States Patent
Schroeder et al.

(10) Patent No.: US 10,336,268 B2
(45) Date of Patent: Jul. 2, 2019

(54) METHOD AND APPARATUS FOR OPERATING A VEHICLE

(71) Applicant: Robert Bosch GmbH, Stuttgart (DE)

(72) Inventors: Christoph Schroeder, Sunnyvale, CA (US); Oliver Pink, Stuttgart (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/517,388

(22) PCT Filed: Oct. 12, 2015

(86) PCT No.: PCT/EP2015/073550
§ 371 (c)(1),
(2) Date: Apr. 6, 2017

(87) PCT Pub. No.: WO2016/062568
PCT Pub. Date: Apr. 28, 2016

(65) Prior Publication Data
US 2017/0291560 A1    Oct. 12, 2017

(30) Foreign Application Priority Data

Oct. 24, 2014 (DE) .......................... 10 2014 221 682

(51) Int. Cl.
*B60R 16/023* (2006.01)
*B60T 7/12* (2006.01)
(Continued)

(52) U.S. Cl.
CPC ............ *B60R 16/0234* (2013.01); *B60T 7/12* (2013.01); *B60T 8/1755* (2013.01); *B60T 8/885* (2013.01);
(Continued)

(58) Field of Classification Search
CPC ........ B60R 16/0234; B60W 30/18054; B60W 50/12
See application file for complete search history.

(56) References Cited

U.S. PATENT DOCUMENTS

2003/0209893 A1* 11/2003 Breed .................. B60J 10/00
280/735
2006/0217864 A1* 9/2006 Johnson ............... B60N 2/002
701/45
(Continued)

FOREIGN PATENT DOCUMENTS

CN        2505346 Y       8/2002
DE    102006039682 A1    2/2008
(Continued)

OTHER PUBLICATIONS

International Search Report for PCT/EP2015/073550, dated Jan. 29, 2016.

*Primary Examiner* — Behrang Badii
*Assistant Examiner* — Daniel L Greene
(74) *Attorney, Agent, or Firm* — Norton Rose Fulbright US LLP; Gerard Messina

(57) ABSTRACT

A method for operating a vehicle, the vehicle being guided in fully automated fashion, and if an error is detected during the fully automated guidance, a safe state being selected from a plurality of safe states as a function of one parameter, the vehicle being guided in fully automated fashion into the selected safe state. Also described is an apparatus for operating a vehicle, as well as to a computer program.

8 Claims, 2 Drawing Sheets

(51) Int. Cl.
*B60W 50/029* (2012.01)
*B60T 8/92* (2006.01)
*B60W 30/09* (2012.01)
*B60W 40/08* (2012.01)
*G05D 1/00* (2006.01)
*B60T 17/18* (2006.01)
*B60T 17/22* (2006.01)
*B60T 8/1755* (2006.01)
*B60T 8/88* (2006.01)
*B60W 30/18* (2012.01)
*B60W 50/12* (2012.01)
*B60W 30/16* (2012.01)

(52) U.S. Cl.
CPC ............... *B60T 8/92* (2013.01); *B60T 17/18* (2013.01); *B60T 17/22* (2013.01); *B60W 30/09* (2013.01); *B60W 30/18054* (2013.01); *B60W 40/08* (2013.01); *B60W 50/029* (2013.01); *B60W 50/12* (2013.01); *G05D 1/0055* (2013.01); *B60T 2270/402* (2013.01); *B60W 30/162* (2013.01); *G05D 2201/0213* (2013.01)

(56) References Cited

U.S. PATENT DOCUMENTS

| | | | |
|---|---|---|---|
| 2007/0198145 A1* | 8/2007 | Norris | B60T 7/22 701/23 |
| 2011/0210867 A1* | 9/2011 | Benedikt | G08G 1/01 340/905 |
| 2011/0241862 A1 | 10/2011 | Debouk et al. | |
| 2014/0309815 A1* | 10/2014 | Ricci | H04W 4/21 701/2 |

FOREIGN PATENT DOCUMENTS

| | | |
|---|---|---|
| DE | 102012202175 A1 | 8/2013 |
| DE | 102012217002 A1 | 3/2014 |
| EP | 2314490 A1 | 4/2011 |
| EP | 2390862 A2 | 11/2011 |
| JP | H10273032 A | 10/1998 |
| JP | H1139566 A | 2/1999 |
| JP | H11165567 A | 6/1999 |
| JP | H11212640 A | 8/1999 |
| JP | 2000113384 A | 4/2000 |
| JP | 2003063373 A | 3/2003 |
| JP | 2004249980 A | 9/2004 |
| JP | 2011240816 A | 12/2011 |
| JP | 2014044707 A | 3/2014 |
| JP | 2014058229 A | 4/2014 |
| JP | 2014153950 A | 8/2014 |
| WO | 2013127387 A1 | 9/2013 |
| WO | 2014180551 A1 | 11/2014 |
| WO | 2015000739 A1 | 1/2015 |
| WO | 2015162764 A1 | 10/2015 |

* cited by examiner

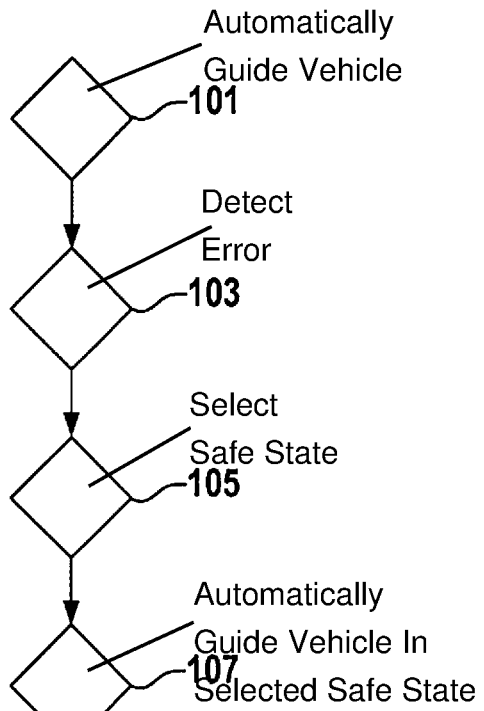
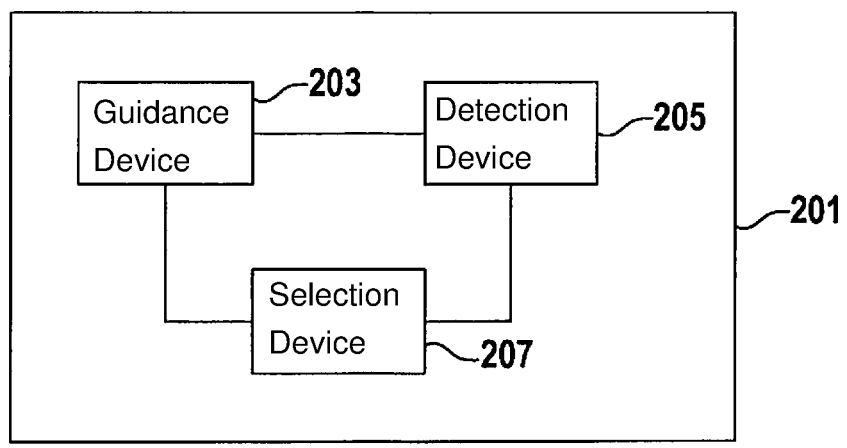

METHOD AND APPARATUS FOR OPERATING A VEHICLE

FIELD OF THE INVENTION

The present invention relates to a method for operating a vehicle, as well as an apparatus for operating a vehicle. The present invention also relates to a computer program.

BACKGROUND INFORMATION

In highly automated driving, it is imperative for safety reasons to monitor the trajectory calculated by the vehicle prior to driving on it. If such monitoring detects an error in the system, the manner in which the system reacts to this error is of great importance. It has been established as state of the art that the trajectory, which is to be traveled in case of emergency, is already calculated together with the normal trajectory by the primary function. This approach has many advantages (in particular, the computing power for the trajectory calculation only has to be made available once (in the primary function)). However, this approach also has disadvantages with regard to the behavior of the vehicle in the event of a system error. Thus, the vehicle would not react to events which happen after the emergency-operation trajectory has been calculated. In particular, this is the case in the context of longer braking distances and higher speeds.

Moreover, halting on the roadway is not the "safest state" in every situation, but rather always a decision based on a concession between additional expenditure and risk.

In particular, it is also state of the art that there is a fixed strategy in the fallback mode, and it is already fixed at the moment of programming.

SUMMARY OF THE INVENTION

The object of the present invention may therefore be seen in the provision of an improved method for operating a vehicle, the method making it possible in case of an error, thus, given the presence of an error, to safely stop the vehicle in various situations.

The object underlying the present invention may also be seen in the indication of a corresponding apparatus for operating a vehicle.

Moreover, the object of the present invention may be seen in the provision of a corresponding computer program.

These objectives are achieved by the respective subject matters of the independent claims. Advantageous developments of the invention are the subject matter of the respective dependent subclaims.

According to one aspect, a method is provided for operating a vehicle, whereby
the vehicle is guided in fully automated fashion,
if an error is detected during the fully automated guidance, a safe state is selected from a plurality of safe states as a function of one parameter,
the vehicle being guided in fully automated fashion into the selected safe state.

According to another aspect, an apparatus is provided for operating a vehicle, including:
a guidance device which is configured to guide the vehicle in fully automated fashion,
a detection device for detecting an error,
a selection device which is configured, upon detection of an error during the fully automated guidance, to select a safe state from a plurality of safe states as a function of one parameter,
the guidance device also being configured to guide the vehicle in fully automated fashion into the selected safe state.

According to a further aspect, a computer program is provided which includes program code to carry out the method for operating a vehicle when the computer program is executed on a computer.

In particular, the present invention thus includes the idea of providing a plurality of safe states, from which one specific state is chosen or selected as a function of one parameter (or, e.g., several parameters that notably are formed identically or differently), the vehicle then being guided in fully automated fashion into this selected safe state. The parameterization thus advantageously permits a flexible adaptation to the specifically existing situation in which the vehicle finds itself at the moment, for not every safe state is the most suitable, safest state for each situation. Thus, for example, the vehicle is advantageously also able to react to events that happen in the case of error, particularly after an emergency-operation trajectory has been calculated. This is especially advantageous in the context of longer braking distances and higher speeds.

Fully automated guidance within the meaning of the present invention means specifically that the driver of the vehicle no longer has to intervene in order to guide the vehicle. The vehicle drives independently, thus, autonomously.

According to one specific embodiment, the plurality of safe states includes elements from the following group of safe states: Standstill on a roadway, standstill in its own lane, standstill in a breakdown lane, standstill in a rest stop, standstill in a parking area, adapting the guidance of the vehicle to a guidance of a vehicle driving in front of the vehicle. In particular, this yields the technical advantage that a majority of the typical situations in which a vehicle could find itself are covered by these safe states. A safe state adapted specially to the situation may thereby be achieved in the respective situation. Safety of the vehicle and of the surrounding traffic is thus increased in advantageous manner.

In another specific embodiment, the parameter describes a traffic situation and/or a sensor availability and/or a hardware availability and/or a state of health of a driver of the vehicle. Specifically, this thus yields the technical advantage that the most sensible decision criteria as to which safe state should be selected are covered. They are suitable especially for the selection of the appropriate safe state for the specific existing situation. In this manner, safety of the vehicle and of the surrounding traffic may advantageously be improved, as well.

With regard to the traffic situation, notably, it should be remarked that, in particular, here the explicit traffic situation, with the speed of the ego vehicle, the position and speed of all other road users and the respective prediction, is a decisive factor. Examples for a traffic situation are as follows: "driving in a traffic jam", "freeway driving, heavy traffic", "freeway driving, slow-moving traffic", "freeway driving, light traffic", "stop & go", "urban driving", "overland driving". That means, for example, that a driving-environment model of a vehicle driving environment is determined. In particular, it is based on the sensing of the vehicle driving environment, e.g., with the aid of a driving-environment sensor system of the vehicle. In so doing, in particular, positions and/or speeds and/or accelerations of the other road users are determined. Correspondingly, the presently existing traffic situation is then specifically classified according to the examples of traffic situations cited above. It should be noted here that the examples for traffic situations indicated above are only examples, but not exhaustive examples.

With regard to the sensor availability, it is noted that here it is a matter, namely, of which driving-environment and inertial sensors of the vehicle are still available. For instance, if the driving-environment sensors to the front fail (thus, loss of a front sensor system), then a different safe state must be selected than if only the rear sensors or the side sensors of the vehicle fail.

For example, sensors within the meaning of the present invention are inertial sensors and/or driving-environment sensors. A driving-environment sensor is, e.g., a radar sensor, an ultrasonic sensor, a video sensor, a laser sensor or a lidar sensor.

With regard to the hardware availability, it should be noted that, for example, the hardware may be one or more control devices in the vehicle. Examples for such control devices are as follows: a central control device on which a setpoint trajectory is calculated or determined, based on which, an actual trajectory of the vehicle is regulated, a braking-system control device, a steering-system control device, a control device of a monitoring function and all further control devices installed in the vehicle. That is, the safe state is selected from the plurality of safe states depending upon which of the aforementioned control devices has an error or has failed (i.e., is or is not available).

According to one specific embodiment, in particular, a monitoring function monitors whether the control devices are still active and, whether they are still generating data that is useful and/or plausible (thus, not leading to a collision). This is determined, for example, by checking the resulting trajectory as to its freedom from collision based on a redundantly calculated driving-environment model; if the resulting trajectory is collision-free, then the control devices are generating useful and plausible data.

An error within the meaning of the present invention is, specifically, an occurrence of an error in at least one of the aforementioned control devices and/or a failure of at least one of the aforementioned control devices.

In particular, an error within the meaning of the present invention is a loss or a malfunction of one or more of the aforesaid sensors.

That means, namely, that in response to a malfunction and/or a failure of one of the aforesaid sensors and/or one of the aforesaid control devices (the plural should always be read at the same time), a safe state is thus selected from the plurality of safe states, the vehicle then being guided into this selected safe state in fully automated fashion.

In particular, the state of health of the driver is also taken as a criterion in order to decide whether or not there is an error, for if, for example, a driver is no longer able to guide the vehicle independently, then due to statutory provision, the vehicle must be guided into a safe state. This is also the case even if the vehicle itself would be able to continue to drive in fully automated fashion. A state of health of the driver may be fainting, for example, or a limited fitness to drive. Namely, a loss of the driver or limited fitness to drive is therefore an error.

In another specific embodiment, the parameter describes a failure of a rear sensor system of the vehicle, and the guidance of the vehicle is adapted to a guidance of a vehicle driving in front of the vehicle. The fact that the guidance of the vehicle is adapted to a guidance of a vehicle driving in front of the vehicle means, in particular, that the vehicle is cruising with the flow of traffic. This driving strategy is advantageous especially on freeways not heavily traveled, with a preceding vehicle and a front sensor system still available. Adapting the guidance of the ego vehicle to the guidance of the preceding vehicle includes, in particular, braking or acceleration to the speed of the preceding vehicle, as well as lane keeping, thus, retaining a present traffic lane.

According to a further specific embodiment, the parameter describes a loss of the driver, and the vehicle is parked in a rest stop or in a parking area. This strategy is especially advantageous when a driver-monitoring system signals back that a driver has health problems. In this situation, for instance, the highly automated vehicle is still completely functional, but because of statutory provisions, is no longer allowed to continue to drive.

In another specific embodiment, the parameter describes a failure of an electronic stability program of the vehicle, and the vehicle is stopped in its own lane. This is an especially easy driving strategy to implement. In particular, it may be used or employed when the vehicle (and, e.g., all surrounding vehicles) are underway a bit faster, and have small spacings between them. For instance, this is the case in a traffic jam in curves. In order not to additionally bring other road users into danger owing to unexpected braking maneuvers, this state may be only activated if vehicles behind the ego vehicle are detected that are not traveling substantially faster than the ego vehicle (maximum distance: which may be, 2-3 times the braking distance in the case of full brake application). They then may have the aforementioned small spacing, so that they see the action of the preceding vehicle (ego vehicle), and brake their vehicle accordingly. This situation is most commonly found in a traffic-jam scenario.

So, for example, in the event the electronic stability program (ESP) fails, but an EPS steering system is still functional, standstill in its own lane will be selected as the safe state. Should there be a functioning redundant steering system in the vehicle, then in a further specific embodiment, this state (thus, standstill in its own lane) is also selected (as the safest state) if the brakes as well as the steering have failed.

In yet another specific embodiment, the parameter describes a failure of a vehicle electronic stability program and of a vehicle steering system, and the vehicle is stopped on the roadway.

If not only the ESP, but also the steering fails, as a rule, the vehicle can only be brought to a standstill with the aid of a redundant brake. Thus, in particular, it is especially sensible to make no further attempts at steering. Specifically, there are essentially the following four states:
1. The vehicle should drive into a roadside stopping area or change lanes to the right edge of the roadway.
2. The vehicle should be kept in its own lane.
3. The vehicle should stop.
4. The vehicle should cruise.

In particular, it depends upon how serious the failure is. If the ESP fails, as a rule, it is only possible to brake with the redundant brake, with the result that the vehicle will be stopped as quickly as possible. Should the steering fail, there is likewise no other option than to come to a standstill as quickly as possible. In the case of a sensor failure, which may be the first state (roadside stopping area/lane change to the right edge of the roadway) or the second state (keep in own lane) is provided.

The present invention is explained in greater detail below on the basis of exemplary embodiments.

BRIEF DESCRIPTION OF THE DRAWINGS

FIG. 1 shows a flowchart of a method for operating a vehicle.

FIG. 2 shows an apparatus for operating a vehicle.

DETAILED DESCRIPTION

Figure 3:
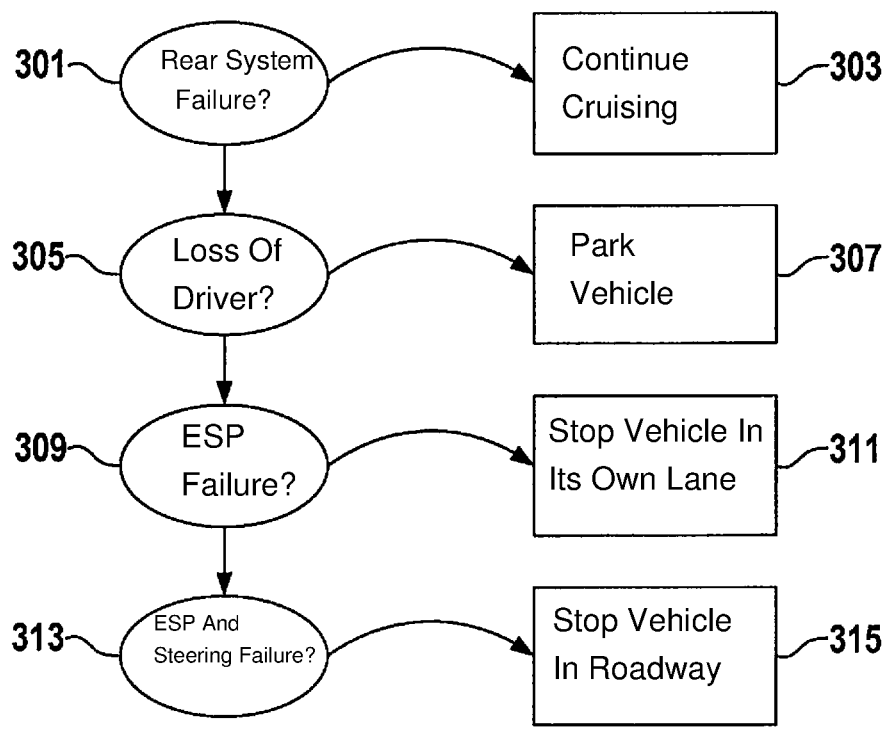
FIG. 3 shows a cascade of safe states.

FIG. 1 shows a flowchart of a method for operating a vehicle.

According to a step 101, the vehicle is guided in fully automated fashion. If, according to a step 103, an error is detected during the fully automated guidance, then according to a step 105, a safe state is selected from a plurality of safe states as a function of one parameter.

For example, an error is a failure and/or a malfunction of one or more control devices in the vehicle and/or a failure and/or a malfunction of one or more sensors, e.g., driving-environment sensors and/or inertial sensors, of the vehicle. For instance, an error is a loss of the driver. An error is a limited fitness of the driver to drive, for example. In particular, several errors are detected.

In a step 107, the vehicle is then guided in fully automated fashion into the selected safe state.

FIG. 2 shows an apparatus 201 for operating a vehicle (not shown).

Apparatus 201 includes a guidance device 203 which is configured to guide the vehicle in fully automated fashion. To that end, in particular, the guidance device is in operative connection with actuators and/or control elements of the vehicle. Guidance device 203 especially is in operative connection with a brake system, a steering system and/or a drive system of the vehicle.

In addition, apparatus 201 includes a detection device 205 for detecting an error. A selection device 207 is also provided which is configured, upon detection of an error by detection device 205 during the fully automated guidance with the aid of guidance device 203, to select a safe state from a plurality of safe states as a function of one parameter. Meanwhile, guidance device 203 is configured to guide the vehicle in fully automated fashion into the safe state which was selected with the aid of selection device 207. For example, the plurality of safe states are stored in a memory.

Thus, in particular, according to the present invention, from a plurality of safe states, the most suitable safe state is selected for the specific existing situation in which the vehicle finds itself at the moment. Based on this selected safe state, the vehicle is then guided in fully automated fashion into this safe state. In particular, the guidance of the vehicle into this safe state includes the guidance of the vehicle based on a predetermined strategy which, for example, may also be referred to as a fallback strategy. The invention thus makes numerous defined fallback strategies available, and selects the most sensible without aid on the basis of decision criteria (described by the parameter(s)) online (and which may be afresh, thus, continuously at each instant during the automated travel).

Advantageously, it is thus made possible at any time and as a function of the situation, a specific system state of the vehicle and a detected malfunction, to automatically determine the safe state from a pool of previously defined and technically possible safe states. According to the present invention, procedures and strategies may be defined in order to select the suitable fallback mode at any point in time. In case of an error, the vehicle, which may also be referred to as an autonomous or fully automated vehicle, is thereby able to come to a safe state without action by the driver. In this context, the definition of the safe state is essentially a function of the situation in which the vehicle finds itself at the moment. Therefore, according to the present invention, specifically, the safe state is selected automatically at each point in time as a function of the situation (described by the parameter), the system state and the detected malfunctions.

The following safe states may be defined by way of example:
1) Standstill on the roadway
2) Standstill in own lane
3) Standstill in the breakdown lane
4) Standstill in the rest stop/parking area
5) Continuation of travel by "cruising in traffic" (thus, for example, adapting the driving strategy of the ego vehicle to the preceding vehicle)

For example, the selection of the safe state is a function of the following assessments:

Traffic Situation

Here, for instance, the explicit traffic situation, with the speed of the ego vehicle, the position and speed of all other road users and the respective prediction, is decisive. Examples would be "driving in a traffic jam", "freeway driving, heavy traffic", "freeway driving, slow-moving traffic", "freeway driving, light traffic", "stop & go", "urban driving", "overland driving".

Sensor Availability

Namely, here it is a question of which driving-environment and inertial sensors are still available. For example, if the driving-environment sensors to the front fail, then the system must select a different safe state than if only the rear sensors or the side sensors fail.

Hardware Availability

In particular, here it is a matter of the control devices in the vehicle which include, for instance, the central control device on which calculations are carried out, the braking-system control device, the steering-system control device, the control device of the monitoring function and/or all further control devices installed in the vehicle.

FIG. 3 shows a cascade of safe states, for which given availabilities may then be defined, for example. Different escalation levels are shown. The least critical level is a continuation of driving (if, for example, a rear sensor should fail), but the fallback mode may further escalate (thus, the further states are started up depending on the situation) if, in addition, for instance, the steering system or the driver are also lost. Therefore, the wording "cascade" used is meant in this context. "Given availabilities" means in this regard that a specific fallback strategy is used depending upon which vehicle components (sensor systems, control devices . . . ) are still functional.

If, according to block 301, a rear sensor system has failed, then, for instance, a continuation of driving correspondent to cruising in traffic according to block 303 is provided.

If, according to block 305, a loss of a driver of the vehicle is detected, then according to block 307, the vehicle is parked in a rest stop or in a parking area (standstill in the rest stop or in the parking area).

If, according to block 309, a failure of an ESP is detected, then according to block 311, the vehicle is stopped in its own lane (standstill in own lane).

If, according to block 313, it is detected that both the ESP and a steering system of the vehicle have failed, then according to block 315, the vehicle is stopped on the roadway (standstill on the roadway).

An illustrative cascade of exemplary strategies in the fallback system may look as follows, for example:
1) Complete redundant continuation of driving:
    A redundantly configured sensor/control device fails. Here, continuing to drive with primary sensors and without redundancy, possibly at reduced speed and with reduced range of functions, is the safest state in certain situations. Certain situations are particular situations in which a different strategy would have an increased risk of accident. For example, braking in lane if the vehicle is driving in the left lane and no vehicle is coming behind the ego vehicle. Then, as the case may be, a rapidly approaching vehicle can run into our (the vehicle) from behind. Reduction of the range of functions: No lane changes, no passing maneuvers, "cruising". Speed reduction in order to bring about shorter braking distance and less required foresight. Maximum allowed braking distance depends upon the functional performance actually remaining (e.g., projection of the surround-field model).

2) Assume the speed of the vehicle in front (thus, the preceding vehicle) and follow the lane:

This strategy includes braking or acceleration to the speed of the preceding vehicle, as well as lane keeping. In particular, this strategy is advantageous on little-used freeways, with vehicle in front and available front sensor system. For example, in the event the rear sensor system fails. "Little-used" means, in particular, that the distances to the vehicle driving ahead or driving behind are considerably greater (») than the braking distance.

3) Active lane change to the emergency stopping lane:

For instance, this strategy is employed if a driver-monitoring system signals back that the driver has health problems. In this situation, the highly automated vehicle is still completely functional, but because of statutory provisions, is no longer allowed to continue to drive.

4) Slow drifting in the direction of the shoulder or emergency stopping lane:

This strategy includes two steps. In the first step, there is no further acceleration. In the second step, the vehicle attempts to drift slowly to the right (in the direction of the shoulder). "Slowly" depends especially upon how much steering-wheel torque is still able to be provided. Here, slowly may mean that the dynamics have no significant influence for the steering control. This strategy is advantageous particularly in situations with few road users, low speed differentials and high absolute speeds.

5) Braking in its own lane:

This is the simplest strategy; it may be used especially when the vehicle (and all surrounding vehicles) are underway a bit faster, and have small spacings between them. For instance, this is the case in a traffic jam in curves. In order not to additionally bring the other road users into danger due to unexpected braking maneuvers, notably, this state is only activated if vehicles are detected behind the ego vehicle which are not traveling substantially faster (e.g., maximum of 10 km/h to 20 km/h faster) than the vehicle (ego vehicle) (maximum distance 2-3 times the braking distance in the case of full brake application). They should then have a distance small enough that they perceive the action of the ego vehicle and brake their vehicle accordingly. This situation is mostly found in traffic-jam scenarios.

In the event the ESP fails, but the steering is still functional, standstill in its own lane may be viewed as the safe state, which is selected from the plurality of safe states. Should there be a functioning redundant steering system in the vehicle, this state would also be the safe state if the brake and the steering were to fail.

6) (Straightline) braking

If not only the ESP, but also the steering fails, the vehicle can only be brought to a standstill with the aid of the redundant brake.

Therefore, according to the present invention, the selection of the fallback strategy is a function of the components installed in the vehicle (e.g., automobile) that are functioning or have failed, as well as the traffic situation.

What is claimed is:

1. A method for operating a vehicle, the method comprising:

guiding the vehicle in a fully automated and driverless manner;

selecting, if an error is detected during the fully automated guidance, a safe state from a plurality of safe states as a function of one parameter; and guiding the vehicle in a fully automated and driverless manner into the selected safe state, wherein the parameter describes a failure of a rear sensor system of the vehicle, and wherein, in response to the failure of the rear sensor system of the vehicle, the guidance of the vehicle is adapted to a guidance of a vehicle driving in front of the vehicle.

2. The method of claim 1, wherein the parameter describes a traffic situation and/or a sensor availability and/or a hardware availability and/or a state of health of a driver of the vehicle.

3. The method of claim 1, wherein the plurality of safe states includes elements from the following group of safe states: standstill on a roadway, standstill in its own lane, standstill in a breakdown lane, standstill in a rest stop, standstill in a parking area, adapting the guidance of the vehicle to a guidance of a vehicle driving in front of the vehicle.

4. The method of claim 3, wherein the parameter describes a loss of the driver, and the vehicle is parked in a rest stop or in a parking area.

5. The method of claim 3, wherein the parameter describes a failure of an electronic stability program of the vehicle, and the vehicle is stopped in its own lane.

6. The method of claim 3, wherein the parameter describes a failure of a vehicle electronic stability program and of a vehicle steering system, and the vehicle is stopped on the roadway.

7. An apparatus for operating a vehicle, including:

a guidance device to guide the vehicle in a fully automated and driverless manner;

a detection device for detecting an error; and a selection device, which is configured, upon detection of an error during the fully automated guidance, to select a safe state from a plurality of safe states as a function of one parameter;

wherein the guidance device is configured to guide the vehicle in a fully automated and driverless manner into the selected safe state, wherein the parameter describes a failure of a rear sensor system of the vehicle, and wherein, in response to the failure of the rear sensor system of the vehicle, the guidance of the vehicle is adapted to a guidance of a vehicle driving in front of the vehicle.

8. A non-transitory computer readable medium having computer program, which is executable by a processor, comprising:

a program code arrangement having program code for operating a vehicle, by performing the following:

guiding the vehicle in a fully automated and driverless manner;

selecting, if an error is detected during the fully automated guidance, a safe state from a plurality of safe states as a function of one parameter; and guiding the vehicle in a fully automated and driverless manner into the selected safe state, wherein the parameter describes a failure of a rear sensor system of the vehicle, and wherein, in response to the failure of the rear sensor system of the vehicle, the guidance of the vehicle is adapted to a guidance of a vehicle driving in front of the vehicle.

* * * * *